US008397843B2

(12) United States Patent
Tsumiyama et al.

(10) Patent No.: US 8,397,843 B2
(45) Date of Patent: Mar. 19, 2013

(54) OUTPUT CONTROL UNIT OF A VEHICLE

(75) Inventors: Yoshinori Tsumiyama, Lincoln, NE (US); Hidetoshi Kaku, Lincoln, NE (US); Tyler Furman, Raymond, NE (US); Kazuma Waida, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 488 days.

(21) Appl. No.: 12/711,820

(22) Filed: Feb. 24, 2010

(65) Prior Publication Data

US 2011/0208403 A1 Aug. 25, 2011

(51) Int. Cl.
*B60K 28/08* (2006.01)

(52) U.S. Cl. ........................ 180/54.1; 180/69.3; 180/290

(58) Field of Classification Search ................. 180/54.1, 180/69.3, 290
See application file for complete search history.

(56) References Cited

U.S. PATENT DOCUMENTS 6,994,388 B2 2/2006 Saito et al.
7,983,817 B2 * 7/2011 Breed ............................ 701/45

* cited by examiner

*Primary Examiner* — Jeffrey J Restifo
*Assistant Examiner* — Erez Gurari
(74) *Attorney, Agent, or Firm* — Wenderoth, Lind & Ponack, L.L.P.

(57) ABSTRACT

An output control unit of a vehicle, having a front riding space and a rear riding space, includes a riding detection device for detecting the presence of a passenger in the rear riding space. When the riding detection device detects the passenger, the output control unit regulates the output of the engine as compared with the output when the riding detection device does not detect a passenger in the rear riding space.

12 Claims, 7 Drawing Sheets

OUTPUT CONTROL UNIT OF A VEHICLE

BACKGROUND OF THE INVENTION

1. Field of the Invention

The present invention relates to an output control unit of a vehicle.

2. Description of the Prior Art

In a vehicle having a front riding space and a rear riding space, when the passenger is seated in the rear riding space, the load distribution of the vehicle is changed, and the vehicle body behavior such as handling is changed as compared with when the passenger is seated only in the front riding space. Depending on when the passenger is seated in the rear riding space or not, drivability is different. An example of the vehicle in which four passengers can ride is disclosed in U.S. Pat. No. 6,994,388.

SUMMARY OF THE INVENTION

The present invention has been made in view of the above problems and an object of the present invention is to provide a vehicle having a front riding space and a rear riding space and performing the output control of the vehicle when the passenger is seated in the rear riding space, thereby improving drivability.

In order to achieve the above objects, a first aspect of the present invention provides an output control unit of a vehicle having a front riding space and a rear riding space, including: riding detection means for detecting the riding of the passenger in the rear riding space; wherein when the riding detection means detects the riding of the passenger, the output control unit regulates the output of the engine of the vehicle as compared with the output when the riding detection means does not detect the riding of the passenger.

With the above configuration, when the passenger is seated in the rear riding space, the output control unit regulates the output of the engine so that the influence of the change of load distribution caused when the passenger is seated in the rear riding space can be reduced. The drivability of the vehicle thus can be improved.

In the first aspect of the present invention, preferable, a rear seat is provided in the rear riding space, wherein the riding detection means is seating detection means for detecting a seated state of the passenger on the rear seat, and wherein when the seating detection means detects the seating of the passenger, the output control unit regulates the output of the engine of the vehicle as compared with the output when the seating detection means does not detect the seating of the passenger.

With the above configuration, when the passenger is seated on the rear seat, the output control unit regulates the output of the engine so that the influence of the change of load distribution caused when the passenger is seated on the rear seat can be reduced. The drivability of the vehicle thus can be improved.

In the first aspect of the present invention, preferable, a rear seat is provided in the rear riding space, wherein the riding detection means is seating detection means for detecting a seated state of the passenger on the rear seat, and wherein when the seating detection means detects the seating of the passenger, the output control unit regulates the output of the engine of the vehicle as compared with the output when the seating detection means does not detect the seating of the passenger, and in this structure, when the seating detection means detects the seating of the passenger for five seconds or more, the output control unit regulates the output of the engine.

With the above configuration, the output of the engine can be regulated by checking that the passenger is seated on the rear seat.

In the first aspect of the present invention, preferable, a rear seat is provided in the rear riding space, wherein the riding detection means is seating detection means for detecting a seated state of the passenger on the rear seat, wherein when the seating detection means detects the seating of the passenger, the output control unit regulates the output of the engine of the vehicle as compared with the output when the seating detection means does not detect the seating of the passenger, and wherein, when the seating detection means detects the seating of the passenger for five seconds or more, the output control unit regulates the output of the engine, and in this structure, the output regulation of the engine of the output control unit is released when the vehicle stops running and the seating detection means does not detect the seating of the passenger for two seconds or more or when an ignition switch is brought to an off state.

With the above configuration, when the vehicle stops running to check that the passenger on the rear seat gets off the vehicle, the output regulation of the engine is released. Therefore, when the passenger rises from the rear seat during the running of the vehicle and the seating detection means does not temporarily detect the seating of the passenger, the output regulation of the engine cannot be released.

In the first aspect of the present invention, preferably, the output control unit retards the ignition timing of the engine to regulate the output of the engine.

With the above configuration, the output of the engine can be easily regulated and when the passenger is seated in the rear riding space, the maximum speed and acceleration of the vehicle can be regulated.

In the first aspect of the present invention, preferably, the output control unit reduces the fuel injection quantity of the engine to regulate the output of the engine.

With the above configuration, the output of the engine can be easily regulated and when the passenger is seated in the rear riding space, the maximum speed and acceleration of the vehicle can be regulated.

In the first aspect of the present invention, preferably, the riding detection means disables detection for five seconds or more, the output control unit regulates the output of the engine.

With the above configuration, when the riding detection means disables detection, the output control unit regulates the output of the engine. When the passenger is seated on the rear seat in a state that the riding detection means fails and the seating of the passenger on the rear seat cannot be detected, the output of the engine can be regulated, as described above.

A second aspect of the present invention is an automatic four-wheel vehicle having the output control unit of the first invention.

With the above configuration, the automatic four-wheel vehicle which can improve drivability can be provided.

DETAILED DESCRIPTION OF THE PREFERRED EMBODIMENTS (First Embodiment)

Figure 1:
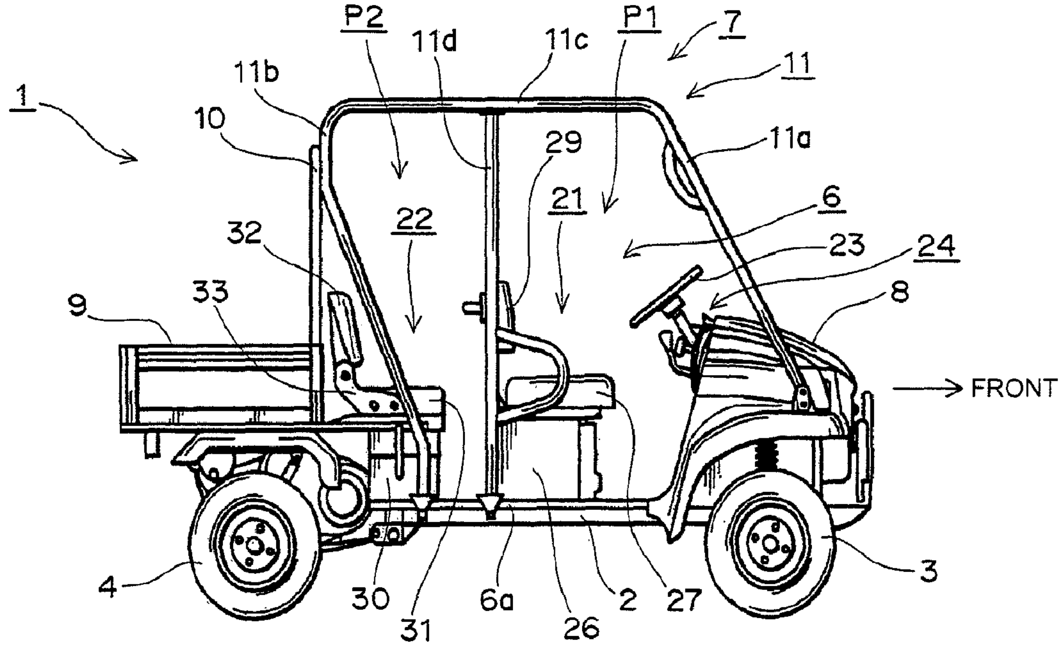
FIG. 1 is a right side view of an all terrain four-wheel vehicle 1 having an output control unit according to a first embodiment of the present invention.
Figure 2:
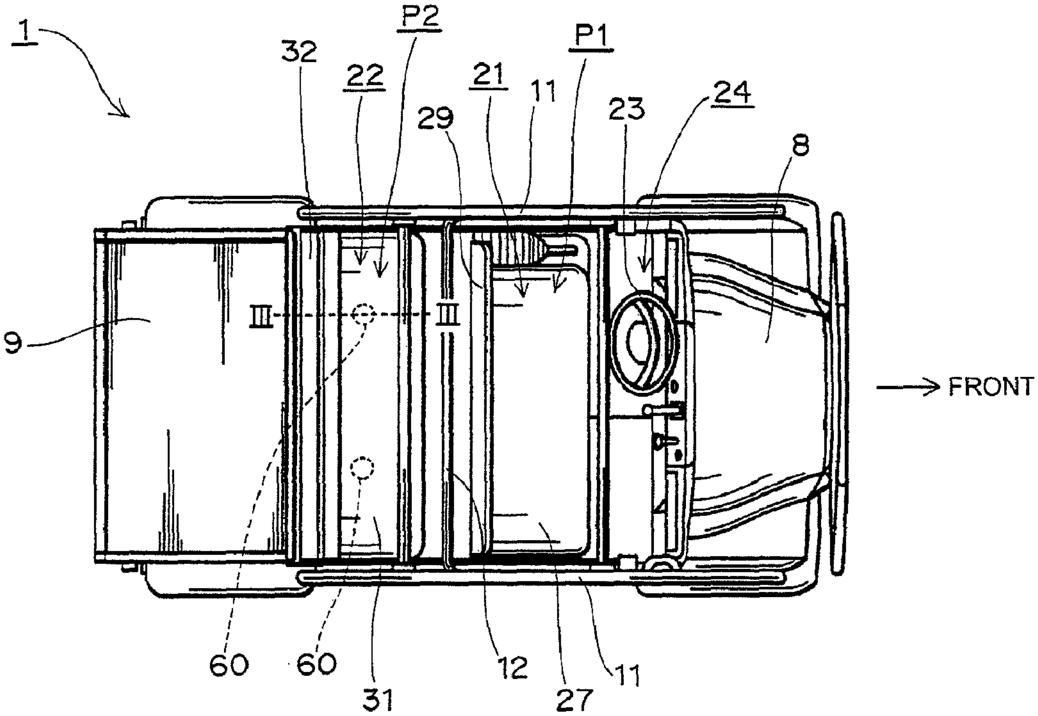
FIG. 2 is a top view of the all terrain four-wheel vehicle 1.

FIG. 1 is a right side view of an all terrain four-wheel vehicle 1 having an output control unit according to a first embodiment of the present invention. FIG. 2 is a top view of the all terrain four-wheel vehicle 1. The all terrain four-wheel vehicle 1 includes a vehicle body 2 supported by a pair of left and right front wheels 3 and a pair of left and right rear wheels 4. A cabin frame 7 configuring a cabin 6 is provided in an intermediate portion on the vehicle body 2 in a front-rear direction. A hood 8 is provided in front of the cabin frame 7. A cargo bed 9 is provided behind the cabin frame 7. A screen shield 10 partitioning the cargo bed 9 and a riding space is provided at a front end of the cargo bed 9.

The cabin frame 7 surrounding the cabin 6 includes a pair of left and right side frame members 11 made of metal pipes formed in a substantially inverted U-shape, and cross frame members 12 made of metal pipes coupling the side frame members 11. Each of the side frame members 11 includes a front side portion 11*a* extended rearward and upward from near left or right side portion of the hood 8, a rear side portion 11*b* extended substantially upward from the left or right side portion at a rear end of the cabin 6, an upper side portion 11*c* integrally coupling the upper end of the front side portion 11*a* and the upper end of the rear side portion 11*b* and extended forward and rearward, and an intermediate vertical portion 11*d* coupling the intermediate portion of the upper side portion 11*c* in the front-rear direction and a floor surface 6*a*.

A bench-shaped front seat 21 is installed in a front riding space P1 in the cabin 6. A bench-shaped rear seat 22 is installed in a rear riding space P2 in the cabin 6. A dashboard (operating portion) 24 having a steering wheel 23 is provided at a front end of the cabin 6.

The bench-shaped front seat 21 includes a seat leg 26 erected on the floor surface 6*a* of the cabin 6, a seating portion 27 provided on an upper end face of the seat leg 26, and a backrest 29 fixed via a supporting stay to the intermediate vertical portion 11*d*. The bench-shaped front seat 21 is typically extended leftward and rightward to near left and right ends of the cabin 6. With this, two persons can be seated side by side. The driver can be seated on one (e.g., left) seating area and the passenger can be seated on the other seating area.

The bench-shaped rear seat 22 is arranged on an upper side of a box 30 housing an engine (not shown) and includes a seating portion 31 and a backrest 32. A pair of left and right stays 33 extended downward are fixed onto the backrest 32. Lower ends of the stays 33 are rotatably coupled to a rear end of the seating portion 31 via hinges. As in the front seat 21, the seating portion 31 and the backrest 32 are extended leftward and rightward to near the left and right ends of the cabin 6. With this, two passengers can be seated side by side.

A plurality (as shown in FIG. 2, in this embodiment, two) of switches 60 are provided in a lower portion of the seating portion 31 of the rear seat 22 so as to be spaced in a vehicle width direction.

Figure 3:
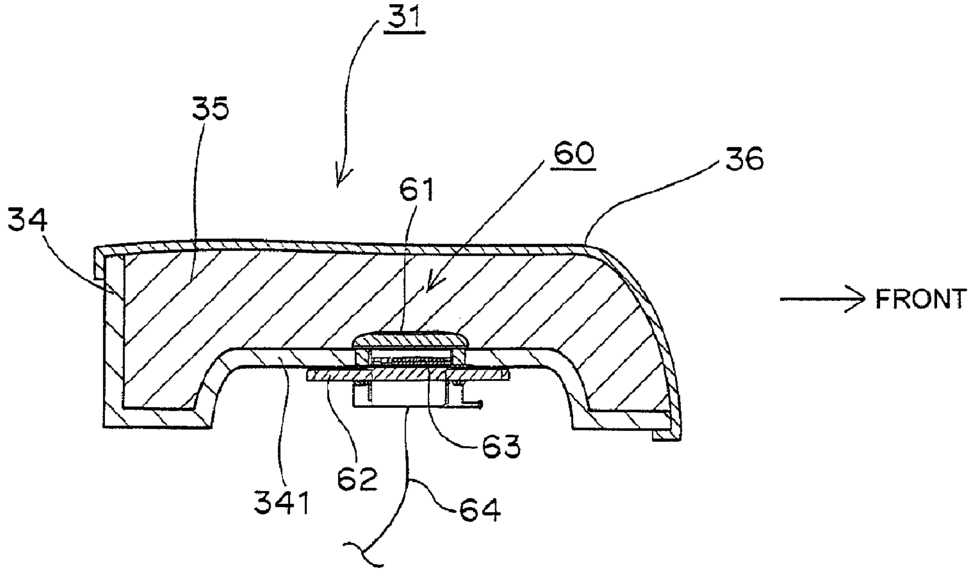
FIG. 3 is a cross-sectional view taken along line of a rear seat 22 of FIG. 2.

FIG. 3 is a cross-sectional view taken along line III-III of the rear seat 22 of FIG. 2. As shown in FIG. 3, the seating portion 31 includes a seat bottom 34, and a cushion portion 35 and a seat cover 36 attached to the seat bottom 34. The seat bottom 34 includes a raised portion 341 protruded upward in the entire vehicle width direction in a center portion in a front-rear direction. The switches 60 are attached to the raised portion 341.

Figure 4:
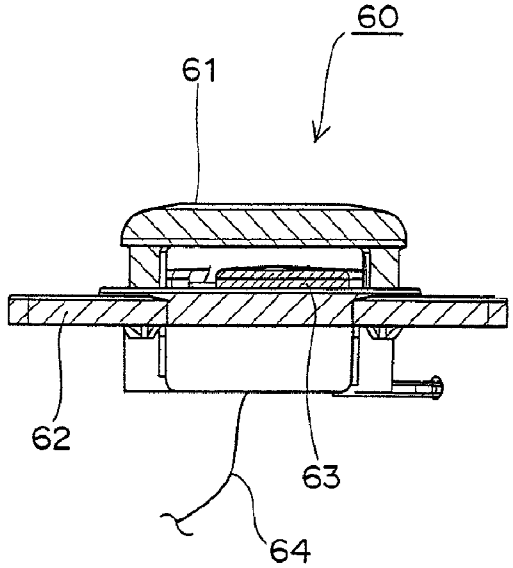
FIG. 4 is an enlarged view of a switch 60 portion of FIG. 3.

FIG. 4 is an enlarged view of the switch 60 portion of FIG. 3. The switch 60 includes a pressure receiving portion 61 adapted to be moved downward by a load from above, and an attached portion 62 attached to the raised portion 341 of the seat bottom 34 by a bolt or the like (not shown). The switch 60 includes a limit switch 63 below the pressure receiving portion 61. When the switch 60 receives the load from above, the pressure receiving portion 61 is moved downward so that the limit switch 63 located below the pressure receiving portion 61 is pressed by the pressure receiving portion 61. Alternatively, when the switch 60 receives the load from above, the pressure receiving portion 61 is flexed downward so that the limit switch 63 located below the pressure receiving portion 61 is pressed by the pressure receiving portion 61.

The pressure receiving portion 61 includes a resilient member. When the passenger rises from the rear seat 22, the pressure receiving portion 61 returns to a state before it moves downward by the resilient force of the resilient member, that is, it moves upward. A pressed state of the limit switch 63 is thus released.

Figure 5:
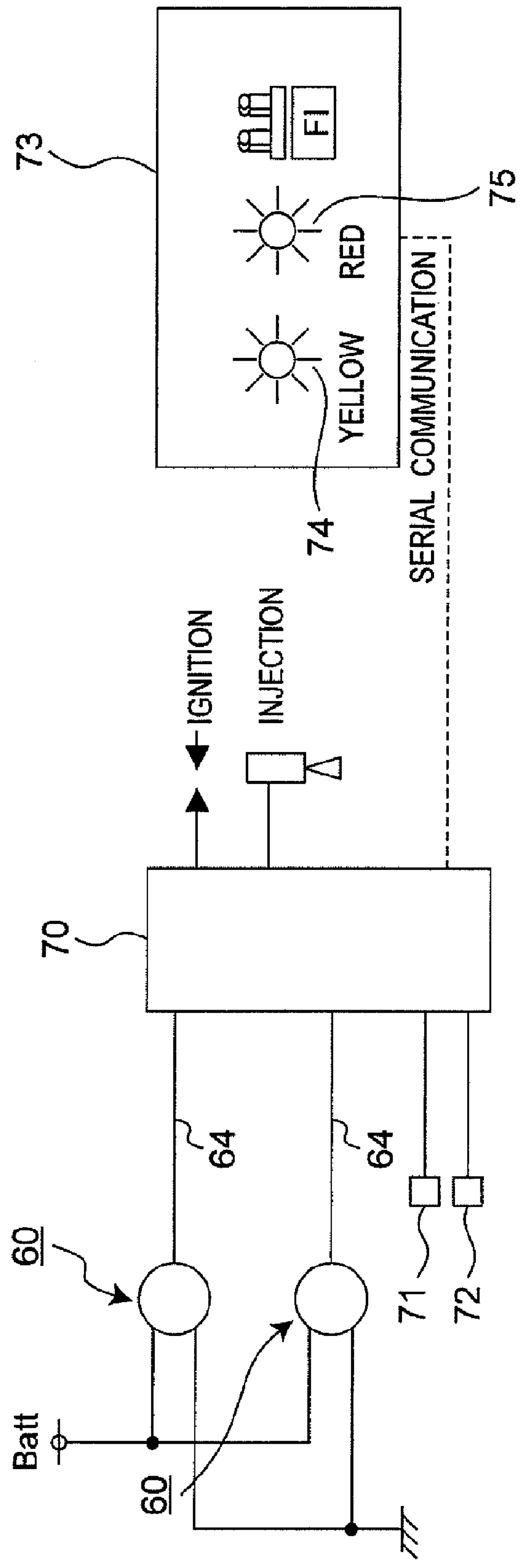
FIG. 5 is a diagram showing the connection configuration of an ECU 70.

The all terrain four-wheel vehicle 1 includes an electronic control unit (ECU) 70 controlling the engine. FIG. 5 is a diagram showing the connection configuration of the ECU 70. As shown in FIG. 5, the ECU 70 controls an ignition timing and a fuel injection quantity based on information from a speed sensor 71 attached to the front wheel 3 or the rear wheel 4 and a crank angle sensor 72 detecting the top dead center position of a cylinder.

The ECU 70 is also connected to the switch 60 by a cable 64 and detects the signal from the limit switch 63 (FIGS. 3 and 4) of the switch 60 (a pressed state is referred to as an on signal and a press released state is referred to as an off signal). In this embodiment, the two switches 60 are provided on the rear seat 22. Therefore, the ECU 70 detects the signals from the two switches 60, performs and releases the output regulation of the engine, and displays the presence or absence of the output regulation of the engine on a meter 73 according to the performance and release of the output regulation of the engine. In other words, in a state that the ECU 70 receives the on signal from the switch 60 to regulate the output of the engine as compared with the output when the seating of the passenger on the rear seat 22 is not detected (or when the off signal from the switch 60 is detected), the ECU 70 turns on or flashes a first display portion 74 of the meter 73. The driver can identify that the output of the engine is regulated. In a state that the ECU 70 receives the off signal from the switch 60 so as not to regulate the output of the engine, the ECU 70 turns off the first display portion 74 of the meter 73. The driver can identify that the output of the engine is not regulated. When the switch 60 fails (the switch 60 body may fail or breaking, a voltage short, or a ground short of the cable 64 may occur), that is, when the ECU 70 cannot detect the signal from the switch 60, the ECU 70 turns on a second display portion 75 of the meter 73 of the engine. The driver can identify that the switch 60 has failed so that the output of the engine is regulated.

The ECU 70 receives the signal from the switch 60 to regulate and release the output of the engine. The specific control contents will be described below.

When detecting the on signal from the switch 60 for five seconds or more, the ECU 70 judges that the passenger is seated on the rear seat 22 and regulates the output of the engine as compared with the output when the seating of the passenger on the rear seat 22 is not detected. In this embodiment, the rear seat 22 includes the two switches 60. When detecting the on signal from at least one of the two switches 60, the ECU 70 regulates the output of the engine.

When the all terrain four-wheel vehicle 1 stops running (detecting from the speed sensor) and when not detecting the on signal from at least one of the switches 60 for two seconds or more (or when detecting the off signal for two seconds or more) or when detecting that the ignition switch is in an off state, the ECU 70 judges that the vehicle does not run in a state that the passenger is seated on the rear seat 22 and releases the regulation of the output of the engine.

When identifying that the signal from at least one of the switches 60 cannot be detected for five seconds or more, the ECU 70 judges that the switch 60 fails and regulates the output of the engine.

Figure 6:
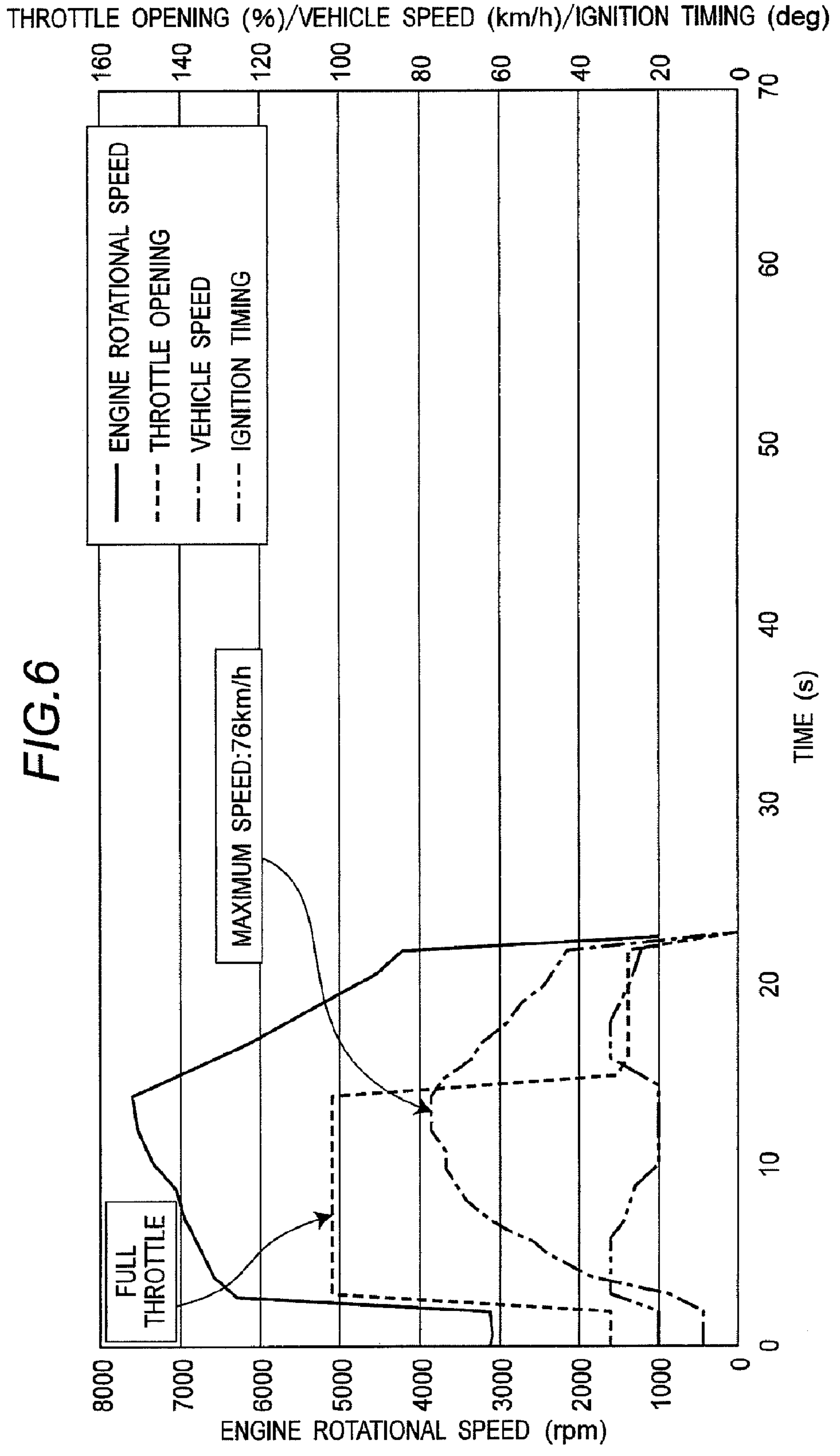
FIG. 6 is a graph showing the change of an engine rotational speed, a throttle angle, a vehicle speed, and an ignition timing with respect to time (horizontal axis) in a state that the ECU 70 does not regulate the output of the engine.
Figure 7:
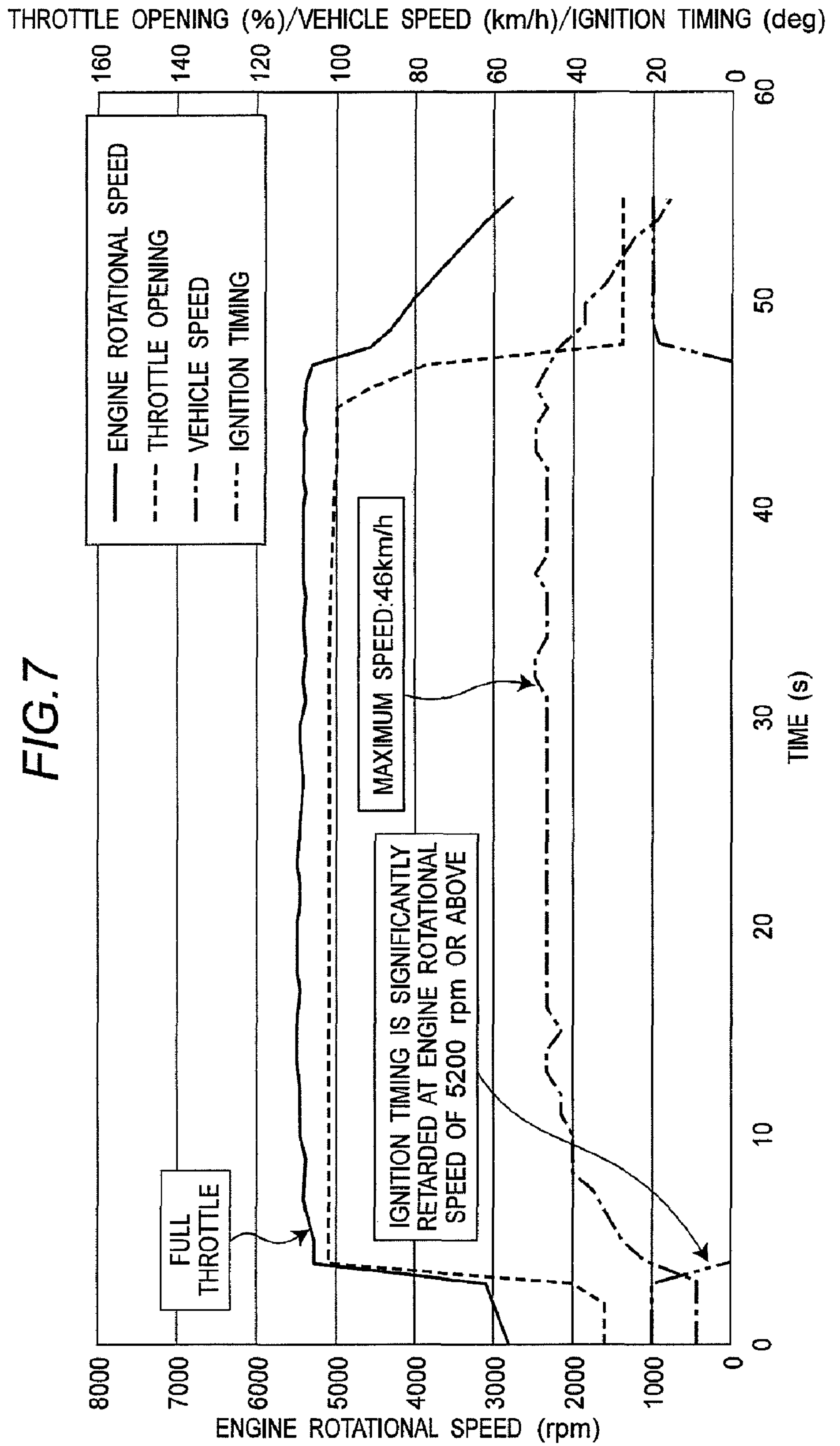
FIG. 7 is a graph showing the change of an engine rotational speed, a throttle angle, a vehicle speed, and an ignition timing with respect to time (horizontal axis) in a state that the ECU 70 regulates the output of the engine.

FIGS. 6 and 7 are graphs showing states of the all terrain four-wheel vehicle 1 when the ECU 70 does not regulate the output of the engine and regulates the output of the engine. The specific means in which the ECU 70 regulates the output of the engine will be described below with reference to FIGS. 6 and 7.

FIG. 6 is a graph showing the change of an engine rotational speed, a throttle opening, a vehicle speed, and an ignition timing with respect to time (horizontal axis) in a state that the ECU 70 does not regulate the output of the engine. When the ECU 70 does not regulate the output of the engine, the throttle is fully opened so that the ECU 70 advances the ignition timing from 20° to about 30°. As a result, the engine rotational speed increases from about 3000 to about 6000 rpm. Thereafter, when the ECU 70 changes the ignition timing between 20° and 30° according to the increase of the engine rotational speed, the engine rotational speed increases up to about 7500 rpm and the maximum speed is about 76 km/h.

When the throttle is closed (the throttle opening is 100% to about 30%), the engine rotational speed is lowered to about 4000 rpm and the vehicle speed is about 40 km/h. When the throttle is substantially fully closed, the engine rotational speed is lowered to 1000 to 1500 rpm so as to be the idling rotational speed. After the vehicle speed of the all terrain four-wheel vehicle 1 is 0 km/h, the ignition switch is turned off to stop the engine.

FIG. 7 is a graph showing the change of an engine rotational speed, a throttle opening, a vehicle speed, and an ignition timing with respect to time (horizontal axis) in a state that the ECU 70 regulates the output of the engine. When the ECU 70 regulates the output of the engine, the throttle is fully opened so that the ECU 70 retards the ignition timing from 20° to 0° or below (about −7° at the minimum). As a result, the engine rotational speed increases from about 3000 to about 5000 rpm. In other words, the amount of increase of the engine rotational speed is reduced as compared with when the ECU 70 does not regulate the output of the engine. At this time, the maximum speed is about 46 km/h.

When the throttle is closed (the throttle opening is 100% to about 30%), the engine rotational speed is lowered to about 4500 rpm and the vehicle speed is 40 km/h or below. In this state, the ECU 70 resets the ignition timing which is retarded to 0° or below (that is, advances the ignition timing to 20°).

The ECU 70 can regulate the output of the engine by various means. In FIG. 7, the ECU 70 retards the ignition timing of the engine to regulate the output of the engine. However, the means for regulating the output of the engine is not limited to the retardation of the ignition timing. For instance, the ECU 70 can regulate the output of the engine by reducing the fuel injection quantity or the throttle opening. The fuel injection quantity may be reduced by shortening the fuel injection time. As a result, the means for regulating the output of the engine can be performed singly or in combination.

According to the above embodiment, the following effects can be exhibited.

(1) When the passenger is seated on the rear seat 22, the ECU 70 regulates the output of the engine. The influence of the change of load distribution caused when the passenger is seated on the rear seat 22 can be reduced. The drivability of the all terrain four-wheel vehicle 1 can be improved.

(2) When detecting the signal from the switch 60 for five seconds or more, the ECU 70 regulates the output of the engine. Therefore, the ECU 70 can regulate the output of the engine by checking that the passenger is reliably seated on the rear seat 22.

(3) When the all terrain four-wheel vehicle 1 stops running and when not detecting the signal from the switch 60 for two seconds or more or when the ignition switch is brought to the off state, the ECU 70 releases the output regulation of the engine. Therefore, when the passenger rises from the rear seat during the running of the all terrain four-wheel vehicle 1 and the ECU 70 does not temporarily detect the signal from the switch 60, the output regulation of the engine is not released immediately.

(4) The ECU 70 retards the ignition timing of the engine to regulate the output of the engine. Therefore, the output of the engine can be easily regulated. For instance, the maximum speed and acceleration of the all terrain four-wheel vehicle 1 can be regulated. In addition, the ECU 70 can regulate the output of the engine by reducing the fuel injection quantity of the engine.

(5) When not detecting the signal from the switch 60 for five seconds or more, the ECU 70 regulates the output of the engine. Therefore, when the passenger is seated on the rear seat 22 in a state that the switch 60 fails and the seating of the passenger on the rear seat 22 cannot be detected, the lowering of the drivability of the all terrain four-wheel vehicle 1 can be prevented.

In this embodiment, the two switches 60 are provided on the rear seat 22 so as to be spaced in the vehicle width direction. Assuming that three persons or more including a child are seated on the rear seat 22, three switches 60 or more may be provided in the vehicle width direction at a spacing different from the above embodiment. When at least one of the switches 60 is brought to an on state, the ECU 70 regulates the output of the engine.

In the above embodiment, the all terrain four-wheel vehicle 1 includes the bench-shaped front seat 21 and rear seat 22. The front seat 21 and the rear seat 22 may be box-shaped. In this case, one switch 60 is provided with respect to one box of the rear seat 22.

When the passenger is seated on the rear seat during the running of the all terrain four-wheel vehicle 1, a state that the output of the engine is not regulated is changed to a state that the output of the engine is regulated during the running of the all terrain four-wheel vehicle 1. When the change of the states is performed suddenly, there is a possibility of giving the driver a feeling that something is wrong. Therefore, it is preferred that the ECU 70 perform control so as to gradually change an output regulation released state to an output regulated state during the running of the all terrain four-wheel vehicle 1. As described above, assuming that the all terrain four-wheel vehicle 1 stops, the output regulated state is changed to the output regulation released state. Accordingly, the gradually change an output regulation state to an output regulation released state is not always necessary.

In the first embodiment, the riding detection means for detecting the riding of the passenger in the rear riding space P2 has been described by taking the switch 60 provided on the rear seat 22 as an example. However, the riding detection means is not limited to the switch 60 provided on the rear seat 22. Another example of the riding detection means will be described below.

Figure 8:
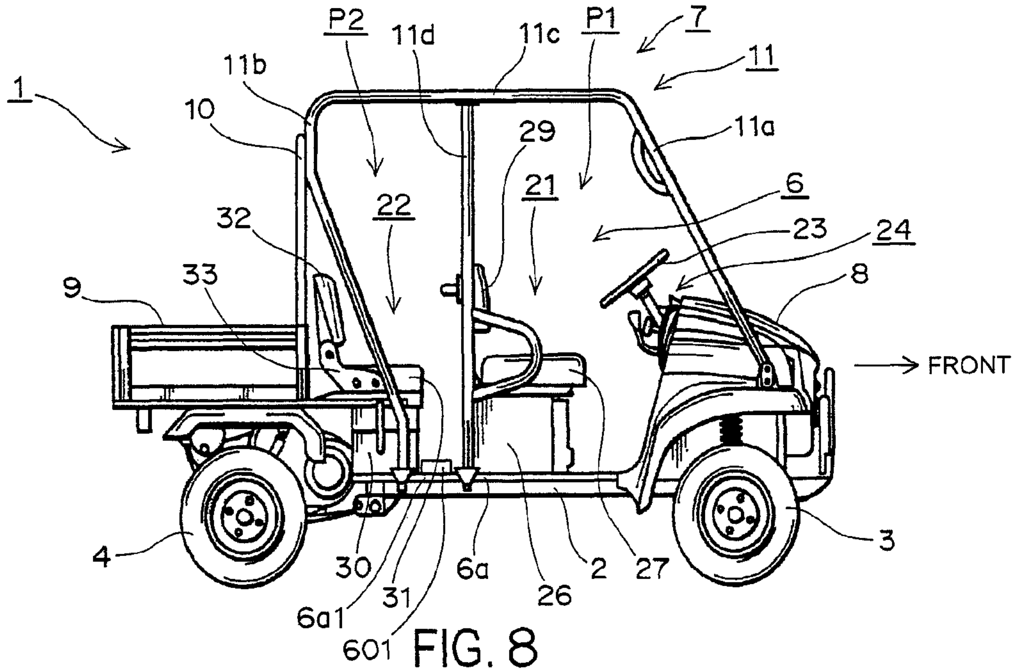
FIG. 8 is a right side view of the all terrain four-wheel vehicle 1 showing another example of riding detection means.
Figure 9:
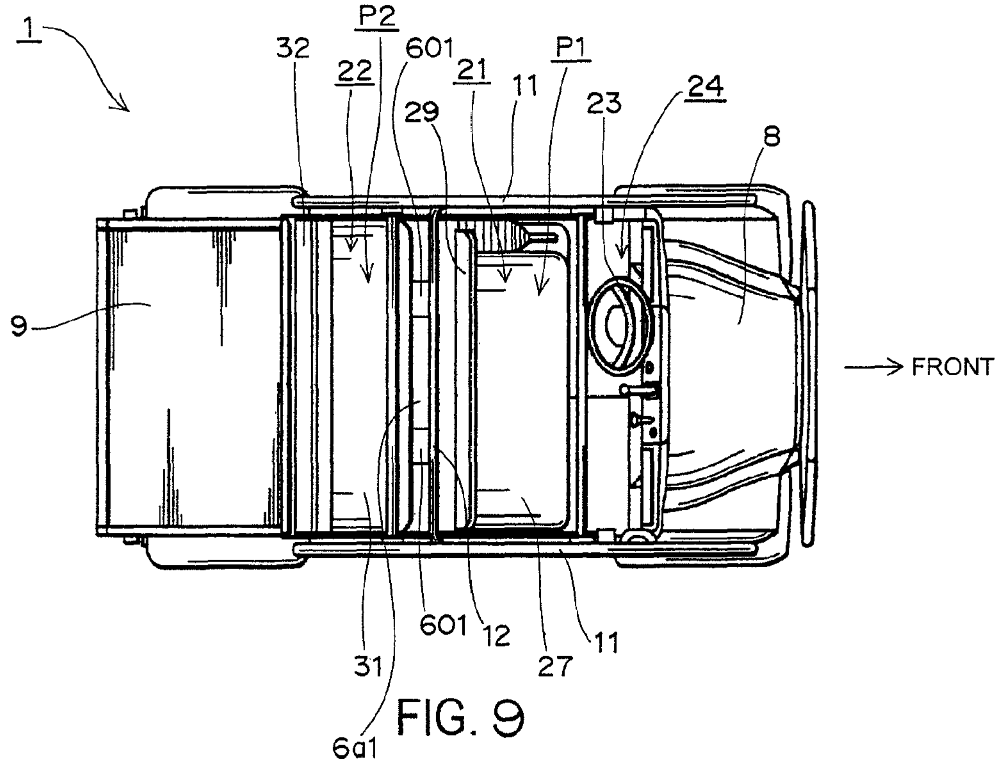
FIG. 9 is a top view of FIG. 8.

FIG. 8 is a right side view of the all terrain four-wheel vehicle 1 showing another example of the riding detection means. FIG. 9 is a top view of FIG. 8. This embodiment has the same configuration as that of the first embodiment except that the configuration and arrangement of the riding detection means are different. In the description of this embodiment, the same components and parts as those of the first embodiment are indicated by similar reference numerals and the detailed description of the contents is omitted.

In this embodiment, the riding detection means is a weight detection sensor 601 provided on the floor surface 6*a* of the cabin 6 in the rear riding space P2. A plurality of weight detection sensors 601 are provided so as to be spaced in the vehicle width direction.

Each of the weight detection sensors 601 receives the weight of the passenger on its upper surface to detect that the passenger is seated in the rear riding space P2. When the weight detection sensor 601 detects the riding of the passenger, the ECU 70 regulates the output of the engine.

The two weight detection sensors 601 are provided so as to be spaced in the vehicle width direction. As in the switch 60 of the first embodiment, three weight detection sensors or more may be provided in the vehicle width direction. When at least one of the weight detection sensors 601 detects the riding of the passenger, the ECU 70 regulates the output of the engine.

Figure 10:
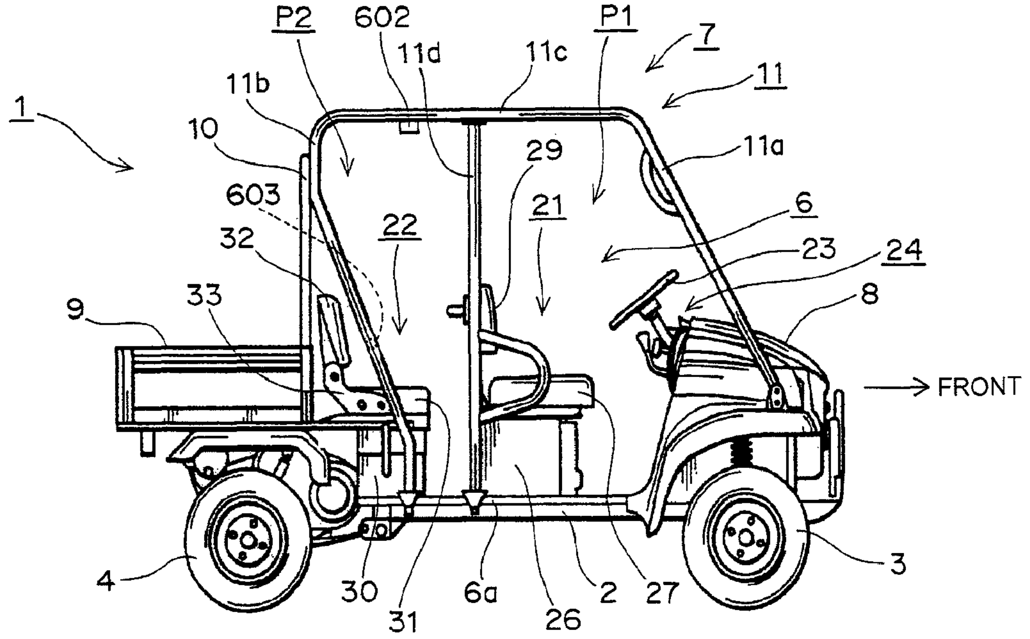
FIG. 10 is a right side view of the all terrain four-wheel vehicle 1 showing a further example of riding detection means.
Figure 11:
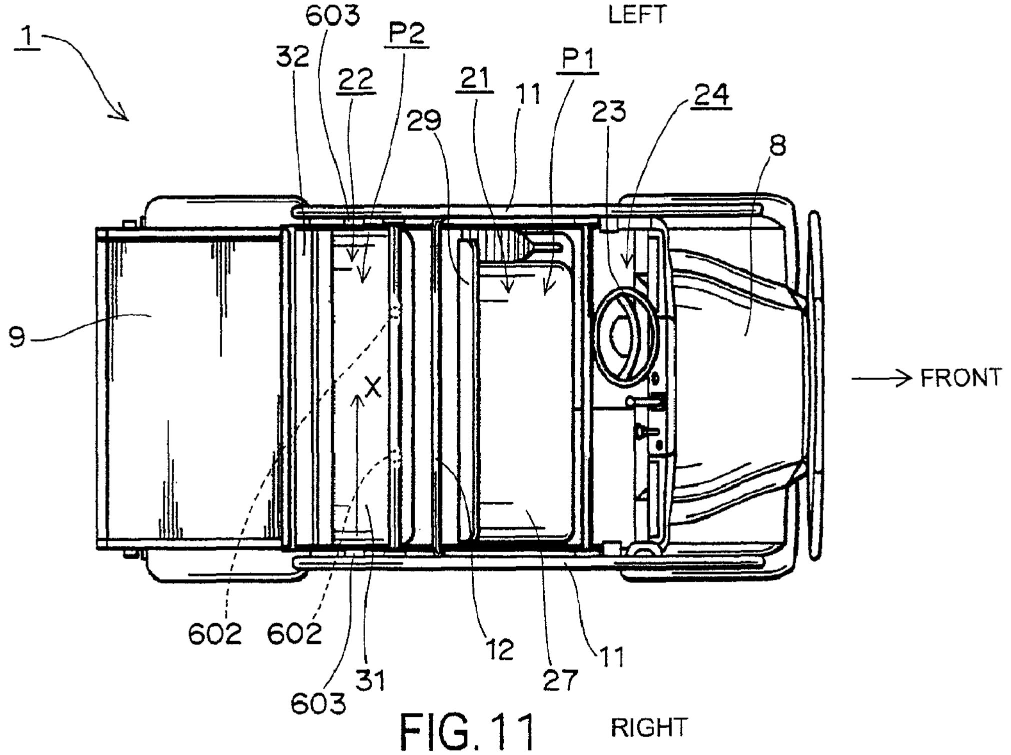
FIG. 11 is a top view of FIG. 10.

FIG. 10 is a right side view of the all terrain four-wheel vehicle 1 showing a further example of the riding detection means. FIG. 11 is a top view of FIG. 10. This embodiment has the same configuration as that of the first embodiment except that the configuration and arrangement of the riding detection means are different. In the description of this embodiment, the same components and parts as those of the first embodiment are indicated by similar reference numerals and the detailed description of the contents is omitted.

In this embodiment, the riding detection means is an infrared sensor 602 provided on the cross frame member 12 located above the rear riding space P2. To improve the infrared detection accuracy from the rear riding space P2, a plurality of infrared sensors 602 are provided so as to be spaced in the vehicle width direction.

Each of the infrared sensors 602 detects an infrared ray from the rear riding space P2 to detect that the passenger is seated in the rear riding space P2. When the infrared sensor 602 detects the riding of the passenger, the ECU 70 regulates the output of the engine.

As shown in FIGS. 10 and 11, the riding detection means may be light sensors 603 provided on the rear side portions 11*b* on the left and right sides of the side frame member 11. In this case, the light sensors 603 have a light emission portion on one of the rear side portions 11*b* on the left and right sides (in FIG. 11, the right side), and a light receiving portion on the other side (in FIG. 11, the left side), respectively. The light emission portion radiates an electronic wave inward (in an X direction) of the rear riding space P2. The light receiving portion receives the electromagnetic wave radiated from the light emission portion. The passenger seated in the rear riding space P2 interferes with the electromagnetic wave radiated from the light emission portion so that the light sensors 603 detect that the passenger is seated in the rear riding space P2. When the light sensors 603 detect the riding of the passenger, the ECU 70 regulates the output of the engine.

Each of the switches 60, the weight detection sensors 601, the infrared sensors 602, and the light sensors 603 can be provided singly in the all terrain four-wheel vehicle 1 and may be provided in combination. The switch 60 detects a seated state of the passenger on the rear seat 22 and the weight detection sensor 601 detects a rising state of the passenger in the rear riding space P2. It is thus preferred that the switch 60 and the weight detection sensor 601 be combined with each other. In addition, the infrared sensor 602 and the light sensor 603 are provided in the positions in which they can detect both the seated state and the rising state of the passenger in the rear riding space P2, thereby enabling detection unaffected by the states (seated and rising) of the passenger in the rear riding space P2.

This embodiment has been described by taking the all terrain four-wheel vehicle as an example. The present invention is not limited to the output control unit of the all terrain four-wheel vehicle. The output control unit of the present invention is widely applicable to vehicles having a front riding space and a rear riding space, e.g., automatic four-wheel vehicles including the all terrain four-wheel vehicles.

The present invention is not limited to the configuration of the above embodiment and includes various modification examples contemplated in the scope without departing from the contents described in the claims.

What is claimed is:

1. An output control unit of a vehicle having a front riding space and a rear riding space, the output control unit comprising:

riding detection means for detecting a riding passenger in the rear riding space;

wherein, when the riding detection means detects the riding of the passenger, the output control unit regulates output of the engine of the vehicle as compared with output when the riding detection means does not detect the riding of the passenger, wherein the output control unit retards the ignition timing of the engine to regulate the output of the engine.

2. The output control unit according to claim 1, wherein a rear seat is provided in the rear riding space, wherein the riding detection means is seating detection means for detecting a seated state of the passenger on the rear seat, and wherein when the seating detection means detects the seating of the passenger, the output control unit regulates the output of the engine of the vehicle as compared with the output when the seating detection means does not detect the seating of the passenger.

3. The output control unit according to claim 2, wherein when the seating detection means detects the seating of the passenger for five seconds or more, the output control unit regulates the output of the engine.

4. The output control unit according to claim 3, wherein the output regulation of the engine of the output control unit is released when the vehicle stops running and the seating detection means does not detect the seating of the passenger for two seconds or more or when an ignition switch is brought to an off state.

5. An output control unit of a vehicle having a front riding space and a rear riding space, the output control unit comprising:

riding detection means for detecting a riding passenger in the rear riding space;

wherein, when the riding detection means detects the riding of the passenger, the output control unit regulates output of the engine of the vehicle as compared with output when the riding detection means does not detect the riding of the passenger wherein the output control unit reduces the fuel injection quantity of the engine to regulate the output of the engine.

6. The output control unit according to claim 1, wherein the riding detection means disables detection for five seconds or more, and the output control unit regulates the output of the engine.

7. An automatic four-wheel vehicle comprising the output control unit according to claim 1.

8. An automatic four-wheel vehicle comprising the output control unit according to claim 5.

9. The output control unit according to claim 5, wherein a rear seat is provided in the rear riding space, wherein the riding detection means is seating detection means for detecting a seated state of the passenger on the rear seat, and wherein, when the seating detection means detects the seating of the passenger, the output control unit regulates the output of the engine of the vehicle as compared with the output when the seating detection means does not detect the seating of the passenger.

10. The output control unit according to claim 9, wherein, when the seating detection means detects the seating of the passenger for five seconds or more, the output control unit regulates the output of the engine.

11. The output control unit according to claim 10, wherein the output regulation of the engine of the output control unit is released when the vehicle stops running and the seating detection means does not detect the seating of the passenger for two seconds or more or when an ignition switch is brought to an off state.

12. The output control unit according to claim 5, wherein the riding detection means disables detection for five seconds or more, and the output control unit regulates the output of the engine.

* * * * *